(12) United States Patent
Liu et al.

(10) Patent No.: US 11,863,547 B2
(45) Date of Patent: *Jan. 2, 2024

(54) SYSTEMS AND METHODS FOR PROVIDING AUTHENTICATION IN A MICROSERVICE SYSTEM

(71) Applicant: Zuora, Inc., Redwood City, CA (US)

(72) Inventors: Wei Liu, Beijing (CN); Henning Schmiedehausen, Los Altos, CA (US); Zhen Wang, Beijing (CN)

(73) Assignee: Zuora, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,471

(22) Filed: Feb. 28, 2023

(65) Prior Publication Data
US 2023/0208830 A1 Jun. 29, 2023

Related U.S. Application Data

(63) Continuation of application No. 16/891,756, filed on Jun. 3, 2020, now Pat. No. 11,595,378.
(Continued)

(51) Int. Cl.
*H04L 9/40* (2022.01)
*H04W 12/06* (2021.01)

(52) U.S. Cl.
CPC .......... *H04L 63/083* (2013.01); *H04W 12/06* (2013.01)

(58) Field of Classification Search
CPC ....... H04L 63/083; H04L 63/08; H04L 63/10; H04L 63/102; H04L 63/0815; H04L 63/0807; H04W 12/06; H04W 12/084
See application file for complete search history.

(56) References Cited

U.S. PATENT DOCUMENTS 9,419,958 B2 * 8/2016 Srivastava ............ H04L 69/329
9,444,808 B1 9/2016 Sherman et al.
(Continued)

OTHER PUBLICATIONS

A. Bánáti, et al., "Authentication and authorization orchestrator for microservice-based software architectures," 2018 41st International Convention on Information and Communication Technology, Electronics and Microelectronics (MIPRO), Opatija, Croatia, 2018, pp. 1180-1184. (Year: 2018).*
(Continued)

*Primary Examiner* — Kari L Schmidt
(74) *Attorney, Agent, or Firm* — Sheppard, Mullin, Richater & Hampton LLP

(57) ABSTRACT

Systems and methods providing authentication in a microservice system. In some embodiments, the method comprises receiving, from the user interface application, a user interface response corresponding to the user interface request; and sending the user interface response to the client computer. Some embodiments comprise when no cache entry corresponding to the user interface session token is present in the user interface session cache, directing the user interface request to a login service. Some embodiments comprise when the login service receives valid login credentials from the client computer, sending a new user interface session token to the client computer. Some embodiments comprise invalidating the cache entries in the user interface session cache according to a cache expiry policy; and determining whether the cache entry corresponding to the particular user interface session token is valid. In some embodiments, the user interface request session token consists of a single value.

18 Claims, 6 Drawing Sheets

Related U.S. Application Data

(60) Provisional application No. 62/856,717, filed on Jun. 3, 2019.

(56) References Cited

U.S. PATENT DOCUMENTS

| | | | |
|---|---|---|---|
| 9,807,119 | B2 | 10/2017 | Watson et al. |
| 9,838,376 | B1 | 12/2017 | Lander et al. |
| 10,013,501 | B2 | 7/2018 | Sundaravaradan et al. |
| 10,120,734 | B1 | 11/2018 | Doraiswamy et al. |
| 10,341,410 | B2 | 7/2019 | Lander et al. |
| 10,511,589 | B2 | 12/2019 | Gangawane et al. |
| 10,860,342 | B2 * | 12/2020 | Kolesnikov ......... G06F 9/45558 |
| 11,089,088 | B2 * | 8/2021 | Das ......................... H04L 67/02 |
| 11,233,801 | B1 | 1/2022 | Robinson |
| 2006/0294192 | A1 | 12/2006 | Mao et al. |
| 2011/0320820 | A1 | 12/2011 | Wray |
| 2012/0144024 | A1 | 6/2012 | Lee |
| 2012/0278425 | A1 | 11/2012 | Maxted |
| 2014/0259147 | A1 | 9/2014 | L'Heureux et al. |
| 2015/0033315 | A1 | 1/2015 | Gadamsetty et al. |
| 2015/0180868 | A1 * | 6/2015 | Sng ..................... H04L 63/0846 726/9 |
| 2015/0373004 | A1 | 12/2015 | Hopkins et al. |
| 2016/0028833 | A1 | 1/2016 | Georgieva |
| 2016/0112538 | A1 | 4/2016 | Wo et al. |
| 2016/0149882 | A1 | 5/2016 | Srivastava |
| 2017/0116125 | A1 | 4/2017 | Sundaravaradan et al. |
| 2017/0116135 | A1 | 4/2017 | Sundaravaradan et al. |
| 2017/0118218 | A1 * | 4/2017 | Koottayi ............... H04L 63/102 |
| 2018/0041336 | A1 | 2/2018 | Keshava et al. |
| 2018/0041598 | A1 | 2/2018 | Vats et al. |
| 2019/0132397 | A1 | 5/2019 | Luczynski et al. |
| 2020/0053089 | A1 | 2/2020 | Singh |
| 2021/0377252 | A1 * | 12/2021 | Monro ............... H04L 63/0884 |

OTHER PUBLICATIONS

Randy Heiland, et al. 2015. Authentication and Authorization Considerations for a Multi-tenant Service. In Proceedings of the 1st Workshop on The Science of Cyberinfrastructure: Research, Experience, Applications and Models (SCREAM '15). Association for Computing Machinery, New York, NY, USA, 29-35. (Year: 2015).*

Batista, Cesar, et al., "Towards a Multi-Tenant Microservice Architecture: An Industrial Experience", 2022 IEEE 46th Annual Computers, Software, and Applications Conference (COMPSAC), 2022 (Year: 2022), pp. 553-562.

Gey, Faith, et al., "Middleware for Customizable Multi-Staged Dynamic Upgrades of Multi-Tenant Saas Applications", 2015 IEEE/ACM 8th International Conference on Utility and Cloud Computing (UCC), 2015 (Year: 2015), pp. 102-111.

Tizzei, Leonardo P., et al., "Using Microservices and Software Product Line Engineering to Support Reuse of Evolving Multi-Tenant SaaS", Proceedings of the 21st International Systems and Software Product Line Conference, vol. A, 2017 (Year: 2017), pp. 205-214.

* cited by examiner

UI Session
Cache 212

| UI Session Token 302 | Tenant ID 310 | Session ID(s) 304 | Authentication Credential 306 | Validity Flag 308 |
|---|---|---|---|---|
| ... | ... | ... | ... | ... |

FIG. 3

SYSTEMS AND METHODS FOR PROVIDING AUTHENTICATION IN A MICROSERVICE SYSTEM

CROSS-REFERENCE TO RELATED APPLICATIONS

This application is a continuation of U.S. patent application Ser. No. 16/891,756, filed Jun. 3, 2020 and entitled "Systems And Methods For Providing Authentication In A Microservice System," which claims the benefit of U.S. Provisional Patent Application No. 62/856,717, filed Jun. 3, 2019 and entitled "Authentication Approach in a Front-End Microservice Architecture," which are hereby incorporated by reference herein.

TECHNICAL FIELD

This disclosure pertains to systems having microservice architectures. More specifically, this disclosure pertains to providing authentication in such systems.

BACKGROUND

The microservice architecture features a user-facing frontend and a backend that provides services. Authentication mechanisms for the backend are quite mature. However, security mechanisms in the frontend are currently inadequate.

SUMMARY

A claimed solution rooted in computer technology overcomes problems specifically arising in the realm of computer technology. In general, one aspect disclosed features a multi-tenant computing system, comprising: one or more hardware processors; and memory storing instructions that, when executed by the one or more hardware processors, cause the multi-tenant computing system to perform: receiving, from a client computer, a user interface request and a particular user interface session token; determining whether a cache entry corresponding to the particular user interface session token is present in a user interface session cache comprising a plurality of the cache entries, wherein each of the cache entries comprises a respective session identifier, a respective tenant identifier, and a respective authentication credential, wherein the tenant identifier identifies one of a plurality of tenants of the multi-tenant computing system; and when a cache entry corresponding to the particular user interface session token is present in the user interface session cache: retrieving, from the user interface session cache, the cache entry corresponding to the particular user interface session token, obtaining the session identifier, the tenant identifier, and the authentication credential from the retrieved cache entry, and providing the user interface request, the obtained session identifier, the obtained tenant identifier, and the obtained authentication credential to a user interface application having a plurality of sessions with respective services; wherein the user interface application selects one or more of the sessions according to the session identifier, and transmits the user interface request, the obtained tenant identifier, and the obtained authentication credential over the selected one or more of the sessions to one or more of the services; and wherein each of the selected one or more of the services authenticates the user using the obtained authentication credential, retrieves tenant-specific data according to the obtained tenant identifier, and performs a service using the retrieved tenant-specific data according to the user interface request.

Embodiments of the multi-tenant computing system may include one or more of the following features. In some embodiments, the instructions further cause the one or more processors to perform: receiving, from the user interface application, a user interface response corresponding to the user interface request; and sending the user interface response to the client computer. In some embodiments, the instructions further cause the one or more processors to perform: when no cache entry corresponding to the user interface session token is present in the user interface session cache, directing the user interface request to a login service. In some embodiments, the instructions further cause the one or more processors to perform: when the login service receives valid login credentials from the client computer, sending a new user interface session token to the client computer. In some embodiments, the instructions further cause the one or more processors to perform: invalidating the cache entries in the user interface session cache according to a cache expiry policy; and determining whether the cache entry corresponding to the particular user interface session token is valid. In some embodiments, the user interface request session token consists of a single value. In some embodiments, the authentication credential is an OAuth bearer token.

In general, one aspect disclosed features a method being implemented by a multi-tenant computing system including one or more physical processors and storage media storing machine-readable instructions, the method comprising: receiving, from a client computer, a user interface request and a particular user interface session token; determining whether a cache entry corresponding to the particular user interface session token is present in a user interface session cache comprising a plurality of the cache entries, wherein each of the cache entries comprises a respective session identifier, a respective tenant identifier, and a respective authentication credential, wherein the tenant identifier identifies one of a plurality of tenants of the multi-tenant computing system; and when a cache entry corresponding to the particular user interface session token is present in the user interface session cache: retrieving, from the user interface session cache, the cache entry corresponding to the particular user interface session token, obtaining the session identifier, the tenant identifier, and the authentication credential from the retrieved cache entry, and providing the user interface request, the obtained session identifier, the obtained tenant identifier, and the obtained authentication credential to a user interface application having a plurality of sessions with respective services; wherein the user interface application selects one or more of the sessions according to the session identifier, and transmits the user interface request, the obtained tenant identifier, and the obtained authentication credential over the selected one or more of the sessions to one or more of the services; and wherein each of the selected one or more of the services authenticates the user using the obtained authentication credential, retrieves tenant-specific data according to the obtained tenant identifier, and performs a service using the retrieved tenant-specific data according to the user interface request.

Embodiments of the method may include one or more of the following features. Some embodiments comprise receiving, from the user interface application, a user interface response corresponding to the user interface request; and sending the user interface response to the client computer. Some embodiments comprise when no cache entry corresponding to the user interface session token is present in the user interface session cache, directing the user interface request to a login service. Some embodiments comprise when the login service receives valid login credentials from the client computer, sending a new user interface session token to the client computer. Some embodiments comprise invalidating the cache entries in the user interface session cache according to a cache expiry policy; and determining whether the cache entry corresponding to the particular user interface session token is valid. In some embodiments, the user interface request session token consists of a single value.

In general, one aspect disclosed features a non-transitory computer readable medium comprising instructions that, when executed, cause one or more processors in a multi-tenant computing system to perform: receiving, from a client computer, a user interface request and a particular user interface session token; determining whether a cache entry corresponding to the particular user interface session token is present in a user interface session cache comprising a plurality of the cache entries, wherein each of the cache entries comprises a respective session identifier, a respective tenant identifier, and a respective authentication credential, wherein the tenant identifier identifies one of a plurality of tenants of the multi-tenant computing system; and when a cache entry corresponding to the particular user interface session token is present in the user interface session cache: retrieving, from the user interface session cache, the cache entry corresponding to the particular user interface session token, obtaining the session identifier, the tenant identifier, and the authentication credential from the retrieved cache entry, and providing the user interface request, the obtained session identifier, the obtained tenant identifier, and the obtained authentication credential to a user interface application having a plurality of sessions with respective services; wherein the user interface application selects one or more of the sessions according to the session identifier, and transmits the user interface request, the obtained tenant identifier, and the obtained authentication credential over the selected one or more of the sessions to one or more of the services; wherein each of the selected one or more of the services authenticates the user using the obtained authentication credential, retrieves tenant-specific data according to the obtained tenant identifier, and performs a service using the retrieved tenant-specific data according to the user interface request.

Embodiments of the non-transitory computer readable medium may include one or more of the following features. In some embodiments, the instructions further cause the one or more processors to perform: receiving, from the user interface application, a user interface response corresponding to the user interface request; and sending the user interface response to the client computer. In some embodiments, the instructions further cause the one or more processors to perform: when no cache entry corresponding to the user interface session token is present in the user interface session cache, directing the user interface request to a login service. In some embodiments, the instructions further cause the one or more processors to perform: when the login service receives valid login credentials from the client computer, sending a new user interface session token to the client computer. In some embodiments, the instructions further cause the one or more processors to perform: invalidating the cache entries in the user interface session cache according to a cache expiry policy; and determining whether the cache entry corresponding to the particular user interface session token is valid. In some embodiments, the user interface request session token consists of a single value. In some embodiments, the authentication credential is an OAuth bearer token.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 3 illustrates the structure of the UI session cache according to some embodiments of the disclosed technology.

DETAILED DESCRIPTION

Figure 1:
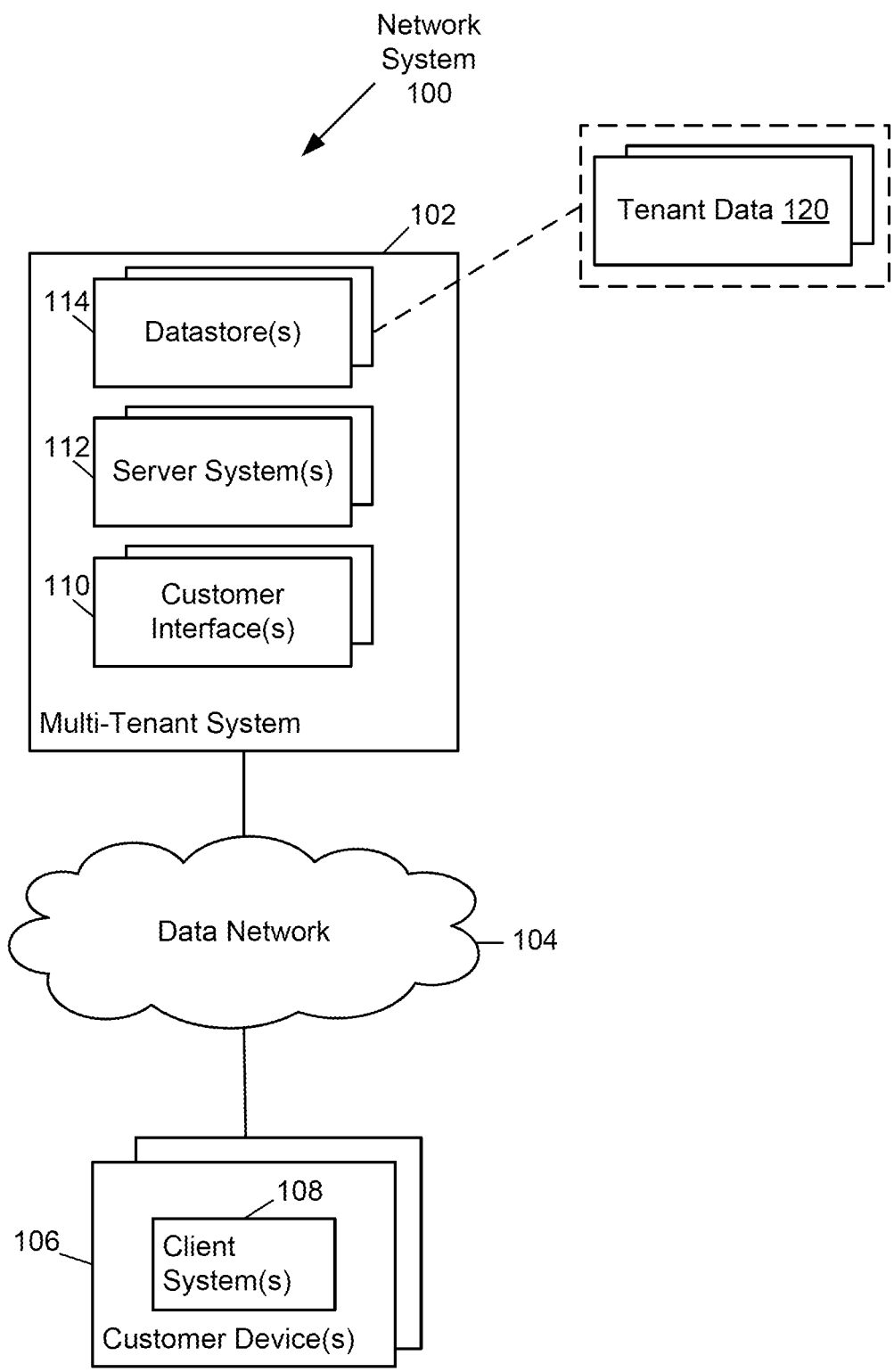
FIG. 1 is a block diagram of a network system for providing cloud-based software-as-a-service (SAAS) services of a multi-tenant system to multiple tenants according to some embodiments of the disclosed technology.

The microservice architecture is increasingly popular, especially for providing multi-tenant systems that host data and provide services for many different tenants. In these systems, security remains paramount. A malicious user could do great damage if the system security were inadequate.

One conventional security approach is session-based authentication. According to this approach, the system maintains a session between the user browser and the system server. While this approach may work in a monolithic application, it does not work in the case of microservices, where requests must be routed to multiple independent services over multiple sessions.

Another conventional security approach is encrypted-payload token-based authentication. According to this approach, a token with an encrypted payload provides security claims between parties. For example, once a user has logged into a system, the system may send the user browser an encrypted token that the browser can include in subsequent requests to prove the logged-in status. One example is the JSON Web Token (JWT) described by industry standard RFC 7519. Each token includes encrypted content and contains sensitive information. A malicious user could hijack and decrypt the token, and use the sensitive information to access the system.

The microservice architecture features a user-facing frontend and a backend that provides the services. Most of the recent work in the microservices field has been focused on the backend, where the authentication mechanisms are quite mature. The inventors have realized that security can be improved at the frontend as well.

Embodiments of the disclosed technology provide separate and different authentication mechanisms at the frontend and backend. According to some embodiments, the frontend employs a stateless interface with the user. That is, the user browser does not maintain a session with the server side. Instead, the system includes one or more user interface (UI) applications behind the frontend that maintain sessions with services in the backend.

After authenticating the user, the frontend provides the user browser with a special UI session token. The UI session token contains no information, and so cannot be used to access the backend. Instead, the UI session token may include only a single unique value. For example, the UI session token may be implemented as a browser cookie. The frontend caches the UI session token, as well as the user's authentication credentials and the identities of the user's active sessions.

The user browser appends the UI session token to each UI request sent to the system. On receiving a UI request, the frontend uses the appended UI session token to look up the corresponding cache entry, which contains the user's authentication credentials and the identity of the user's sessions with services. The frontend then passes the UI request, user's authentication credentials, and session identifiers to one or more UI applications. The UI applications identify the user's sessions using the session identifiers, and transmit the UI request and the user's authentication credentials over the sessions to an application programming interface (API) gateway, where the user is authenticated. The API gateway then passes the user request over the sessions to the services.

Embodiments of the disclosed technology may be implemented in a multi-tenant subscription billing system. Before describing embodiments of the disclosed technology in detail, an example multi-tenant subscription billing system is described. However, it should be appreciated that embodiments of the disclosed technology may be implemented in any UI system.

FIG. 1 is a block diagram of a network system 100 for providing cloud-based software-as-a-service (SAAS) services of a multi-tenant system 102 to multiple tenants according to some embodiments of the disclosed technology. Examples of the cloud-based SAAS services include data storage, data processing, and business-oriented applications. In some embodiments, each tenant may be a subscription-based entity or provider (e.g., an internet service provider, a home security system and service provider, a cellular phone service provider, or entertainment content provider). Each tenant may include a group of one or more users (e.g., individuals, business entities, customers of the business entities, systems) who share access to the cloud-based services. In one embodiment, a tenant includes a service entity such as AT&T, Netflix, Verizon, and/or the like. A tenant may include one or more products or services of an entity. For example, AT&T internet products may be a particular tenant, and AT&T security products may be another tenant. In some embodiments, the cloud-based SAAS services relate to managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources to host the cloud-based SAAS services to the tenants. The shared resources may include processors, memory, virtual systems, services, application programs, load balancers, firewalls, and/or the like. As shown, the multi-tenant system 102 includes tenant interfaces 110, server systems 112, and datastores 114. Each of the client devices 106 includes a client system 108 that accesses the cloud-based SAAS services hosted by the multi-tenant system 102. In some embodiments, the client systems 108 may be operated by employees (e.g., administrator users) of the provider of the provider of the multi-tenant system 102. In some embodiments, the client systems 108 may be operated by employees of the tenant. In some embodiments, the client systems 108 may be operated by end users of the tenant's services.

Each client device 106 may include a desktop, laptop, notebook, tablet, personal digital assistant, smart phone, or other consumer electronic devices incorporating one or more computer components. The client system 108 on each client device 106 may include hardware, software and/or firmware for communicating with the multi-tenant system 102 and accessing the cloud-based services it hosts. Examples of the client systems 108 may include web browsers, client engines, drivers, user interface components, proprietary interfaces, and/or the like.

The multi-tenant system 102 includes hardware, software and/or firmware to host the cloud-based services for the tenants. It will be appreciated that the typical multi-tenant system 102 may offer access to shared resources including systems and applications on shared devices and offer each tenant the same quality or varying qualities of service. In some embodiments, the multi-tenant system 102 does not use virtualization or instantiation processes. In some embodiments, a multi-tenant system 102 integrates several business computing systems into a common system with a view toward streamlining business processes and increasing efficiencies on a business-wide level.

In some embodiments, the multi-tenant system 102 includes a user interface tier of multiple tenant interfaces 110, a server tier of multiple server systems 112, and a datastore tier of multiple datastores 114 for the multiple tenants. In some embodiments, the tenant interfaces 110 includes graphical user interfaces and/or web-based interfaces to enable tenants to access the shared services hosted by the multi-tenant system 102. The tenant interfaces 110 may support load balancing when multiple tenants (and/or multiple customers of the tenants) try to access the multi-tenant system 102 concurrently. The tenant interfaces 110 may additionally or alternatively include an operator interface for use by a systems operator to configure or otherwise manage the multi-tenant system 102. In some embodiments, each tenant may be associated with a subset of the total tenant interfaces 110 for load balancing.

In some embodiments, the server systems 112 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, and/or the like. Similar to the tenant interfaces 110, in some embodiments, the server systems 112 may support load balancing when multiple tenants (and/or multiple customers of tenants) try to access the multi-tenant system 102 concurrently. Further, in some embodiments, each tenant may be associated with a subset of the total server systems 112 for load balancing.

In some embodiments, tenant data 120 for each tenant may be stored in a logical store across one or more datastores 114. In some embodiments, each tenant uses a logical store that is not assigned to any predetermined datastores 114. Each logical store may contain tenant data 120 that is used, generated and/or stored as part of providing tenant-specific business services or functions. In some embodiments, the datastores 114 may include relational database management systems (RDBMS), object-based database systems, and/or the like. In some embodiments, tenant data 120 may be stored across multiple datastores 114, with each datastore dedicated to a particular service (e.g., managing customer records, managing product and/or service consumption information, managing billing information, managing payment information, and/or the like).

In some embodiments, the tenant data 120 may include subscription information, such as billing data and/or subscription status (e.g., active, canceled, suspended, re-activated). Billing data may include billing invoice data (e.g., date of invoices and invoice amounts, overage charge dates and overage charge amounts), payment transaction data (e.g., date of payments, amount of payments), payment methods (e.g., credit card, debit card), payment plan (e.g., annual billing, monthly billing), and/or service plan information (e.g., the name of a service plan). Subscription information may also include a geographic region and/or location associated with a tenant, service, and/or subscriber. In some embodiments, the tenant data 120 may include usage data (e.g., account activity data), such as new subscriptions, changes to subscribed products and/or services, cancellation of one or more products and/or services, subscriptions to new products and/or services, application of discounts, loyalty program package changes (e.g., additional programs and/or services, special rates, and/or the like for loyal customers), reduction or increase of rates for products and/or services, and/or cancellation of the application. In some embodiments, account activity may include usage of a product and/or product of a subscriber (e.g., what channels the subscriber actually watches, what services and what level of consumption the subscriber receives, quality of the product and/or services, and/or the like).

In some embodiments, the tenant data 120 may be stored in one or more data formats (or, simply, formats). For example, subscription tenant data may be stored in a particular format, and usage tenant data may be stored in another format. As used herein, formats may include data types, variable types, protocols (e.g., protocols for accessing, storing, and/or transmitting data), programming languages, scripting languages, data value parameters (e.g., date formats, string lengths), endpoint locations and/or types, and/or the like.

The data network (or, communication network) 104 may represent one or more computer networks (e.g., LAN, WAN, or the like) or other transmission mediums. The data network 104 may provide communication between the systems, engines, datastores, components, and/or devices described herein. In some embodiments, the data network 104 includes one or more computing devices, routers, cables, buses, and/or other network topologies (e.g., mesh, and the like). In some embodiments, the data network 104 may be wired and/or wireless. In various embodiments, the data network 104 may include the Internet, one or more wide area networks (WANs) or local area networks (LANs), one or more networks that may be public, private, IP-based, non-IP based, and so forth.

Figure 2:
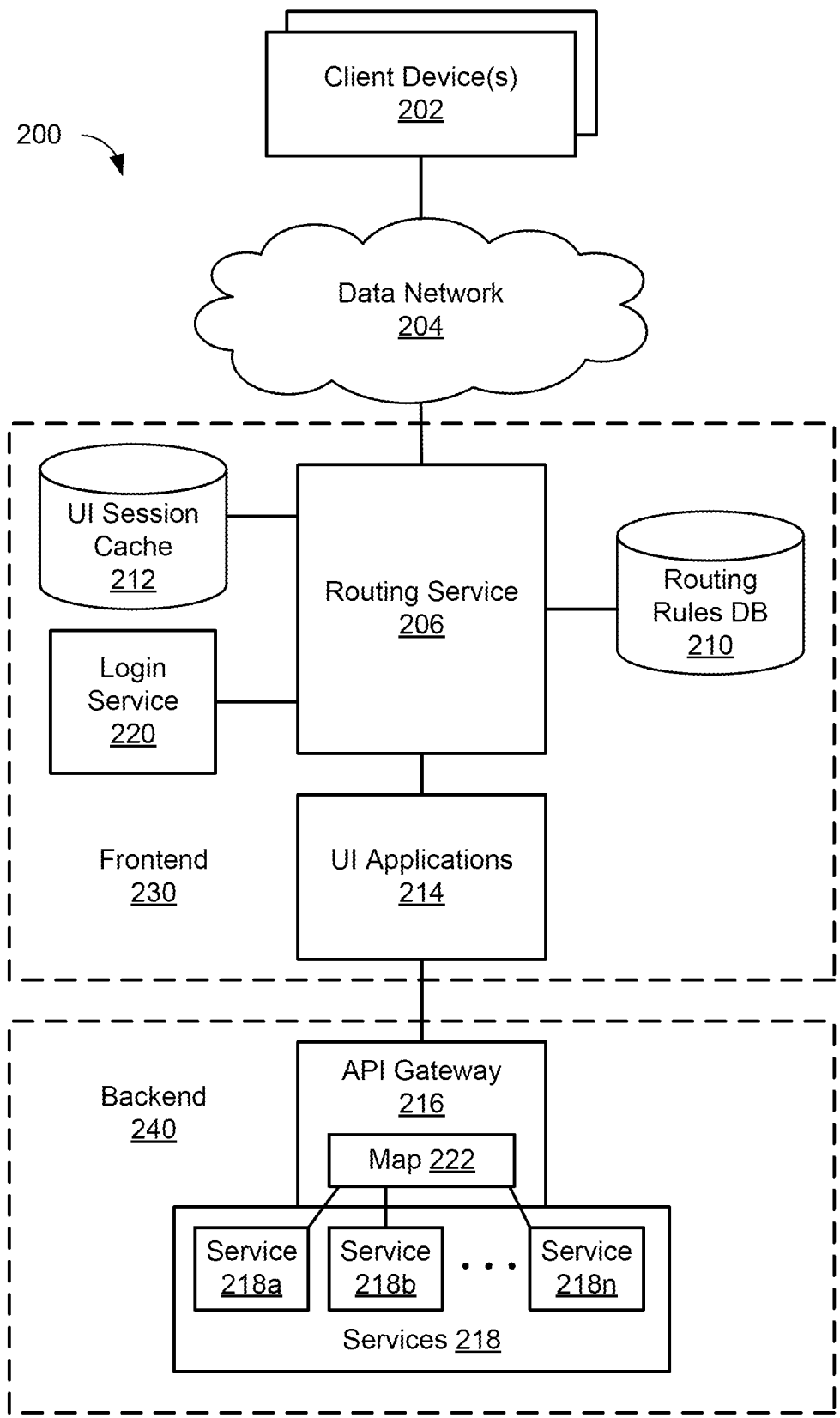
FIG. 2 is a block diagram illustrating a system for providing authentication frontend microservice system according to some embodiments of the disclosed technology.

FIG. 2 is a block diagram illustrating a system 200 for providing authentication in a microservice system according to some embodiments of the disclosed technology. The process 200 may be implemented, for example, in the multi-tenant billing system 100 of FIG. 1. Referring to FIG. 2, the system 200 may include a frontend 230 and a backend 240. The frontend 230 and backend 240 may be implemented in a manner similar to the multi-tenant system 102 described above with reference to FIG. 1.

The system 200 may include one or more client devices 202. The client devices 202 may be implemented in a manner similar to those of the customer devices 106 of the system 100 of FIG. 1. The client devices 202 may communicate with the frontend 230 over a data network 204. The data network 204 may be implemented in a manner similar to that of the data network 104 of the system 100 of FIG. 1.

The backend 240 of the system 200 may include a plurality of services 218, which may include both services and micro-services, for example such as those described above with reference to FIG. 1. In the example of FIG. 2, the services 218 may include n services 218a and 218b through 218n. The backend 240 may also include an API gateway 216, which provides access to the services 218. The UI applications 214 may call APIs deployed within the API gateway 216 to provide users with access to the services 218. In some embodiments, the services 218 may be implemented in a walled garden that is accessible only through the API gateway 216.

A single request may require multiple services 218. The API gateway 216 may include a map 222 for selecting one or more services 218 for each request. A single request may require multiple services 218. The services 218 may be performed sequentially, in parallel, and in combinations thereof. For example, a first service 218a may fetch global and tenant-specific data, a second service 218b may execute a query based on the data, and a third service 218n may run a payroll based on the data, all in response to a single request.

The frontend 230 may include a plurality of UI applications 214. The UI applications 214 may provide user interfaces, which may enable users to access the services 218 through the API gateway 216. The UI applications 214 may also maintain user sessions with the services 218.

The frontend 230 may include a routing service 206 that serves as a single point of entry for the system 200. That is, the routing service 206 receives all user interface requests from the client devices 202. In some embodiments, the requests may be Hypertext Transfer Protocol Secure (HTTPS) requests, and the routing service 206 may terminate the SSL connections. For example, the routing service 206 may include a load balancer that may terminate the Secure Sockets Layer (SSL) connections.

The routing service 206 may route the received requests according to routing rules, which may be stored in a routing rules database 210. For example, the routing service 206 may route each request to one or more of the UI applications 214. The routing service 206 may identify routes for requests based on properties of the requests, for example such as path, method, host, and headers. The routing service 206 may allow modification of requests, and may employ filters that may be independently configured for each route. The routing service 206 may act as a final endpoint or shunt. The routing service 206 may allow modification of the routing rules without restarting. The routing service 206 may maintain a local cache of the routing rules, enabling the routing service 206 to function without access to the routing rules database 210.

The routing service 206 may be implemented as a combination of an HTTP router and a reverse proxy. In some embodiments, the routing service 206 and routing rules database 210 may be implemented using the open-source project Mosaic. In these embodiments, the routing service may be implemented using Skipper, which is a routing service written in Go, and the routing rules database 210 may be implemented using Innkeeper, a routing rule management service written in Scala.

The routing service 206 may also act as an authentication agent. The routing service 206 may examine each request for the presence of a UI session token. The routing service 206 may route any request not having a UI session token to a login service 220, wherein the user may login and obtain a UI session token. For example, the user may provide a user ID and password. In multi-tenant implementations, the user may provide a tenant identifier (ID) to identify the tenant the user represents. Alternatively, the routing service 206 may assign a tenant ID, for example based on properties of the request such as source domain and the like. The routing service 206 may include a UI session cache 212. The UI session cache 212 may store UI session tokens and tenant IDs that have been issued to users, along with information concerning the users and user sessions.

FIG. 3 illustrates the structure of the UI session cache 212 according to some embodiments of the disclosed technology. Referring to FIG. 3, the UI session cache 212 of the implemented as a table. One column of the table stores the UI session tokens 302 for the many tenants of the multi-tenant system. Another column stores the tenant ID 310 associated with the UI session token. Another column stores the session identifiers 304. Each session identifier 304 may be a value that uniquely identifies one of the user's current sessions with one of the backend services.

One column stores the authentication credentials 306 of the users. The authentication credentials 306 are used by the API gateway 216 to authenticate the users. In some embodiments, the authentication credentials 306 may include an OAuth bearer token. Another column of the table the store validity flags 308. The routing service 206 may use the validity flags 308 to implement a cache expiration policy. The UI session cache 212 may store additional information as well.

Figure 4:
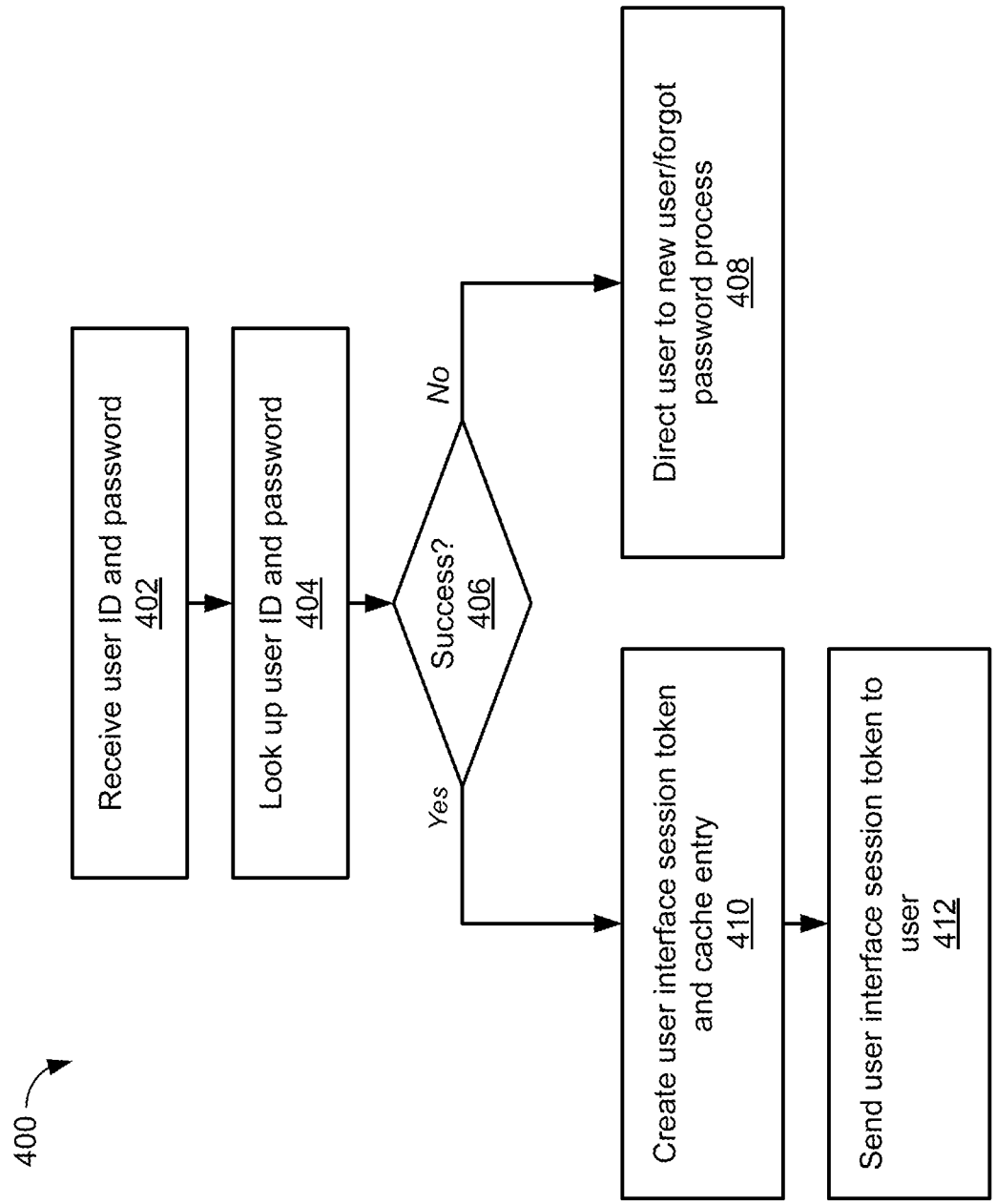
FIG. 4 is a flowchart illustrating a login process according to some embodiments of the disclosed technology.

FIG. 4 is a flowchart illustrating a login process 400 according to some embodiments of the disclosed technology. Elements of the disclosed processes are presented in a particular order. However, it should be understood that one or more of these elements may be performed in a different order, performed concurrently, or omitted, in various embodiments. The login process 400 may begin when the routing service 206 receives a request with no UI session token appended, and redirects that request to the login service 220.

Referring to FIG. 4, the process 400 may include receiving the user ID and password, at 402. The user ID and password may be provided by the user as part of a request. In some embodiments, other authentication credentials may be used instead of, or in addition to, the user ID and password. The process 400 may include looking up the user ID and password, at 404, for example in an authentication database. If the lookup fails, at 406, the process 400 may include redirecting the request to a process for a new user, forgotten password, or the like, at 408.

If the lookup succeeds, at 406, the process 400 may include creating a UI session token 302, as well as a corresponding cache entry in the UI session cache 212, at 410. For example, the cache entry may be implemented as shown in FIG. 3. The process 400 may include sending the UI session token to the originator of the request, at 412.

Figure 5:
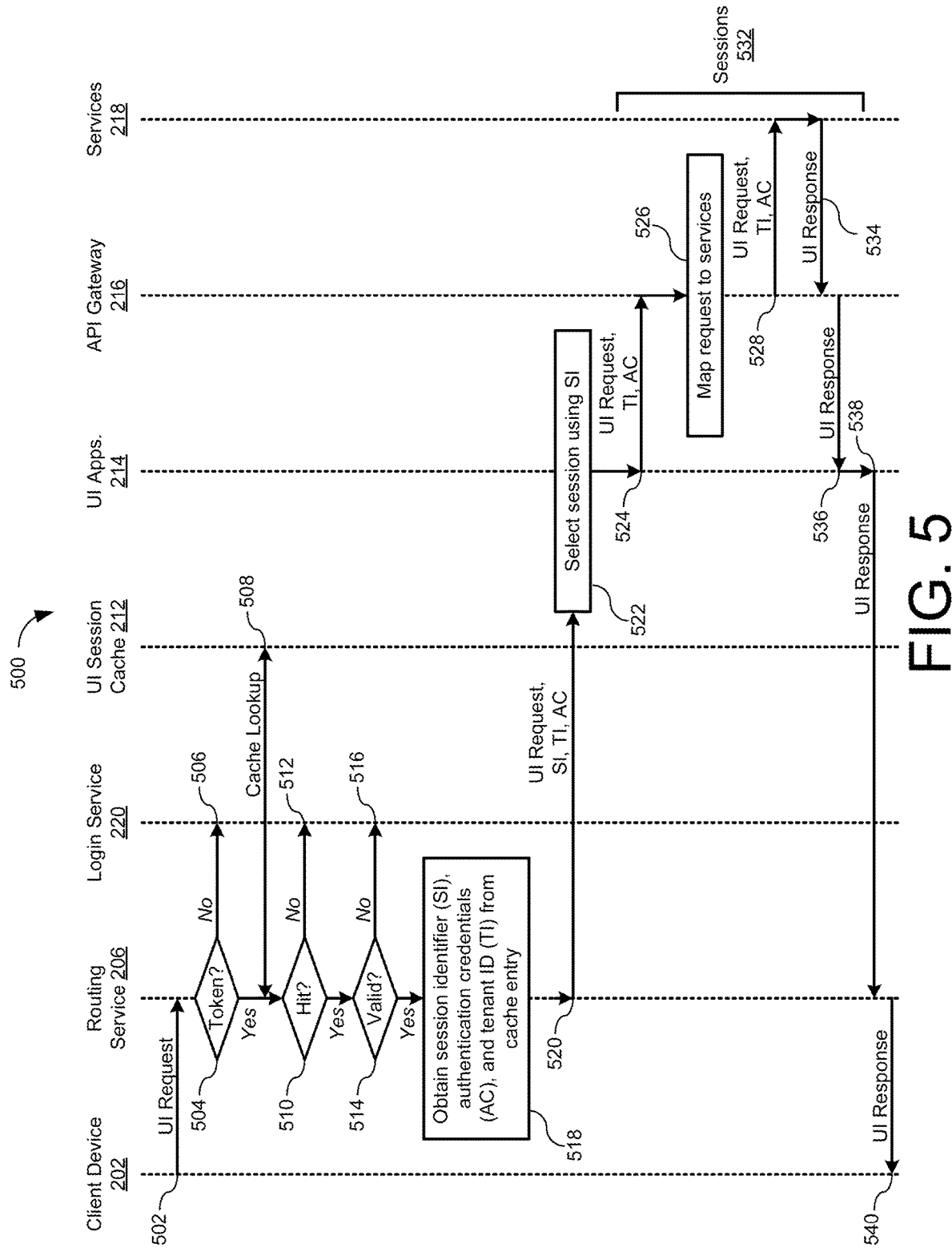
FIG. 5 is a flowchart of a communication process featuring frontend authentication with a UI session token according to some embodiments of the disclosed technology.

FIG. 5 is a flowchart of a communication process 500 featuring frontend authentication with a UI session token 302 according to some embodiments of the disclosed technology. Referring to FIG. 5, process 500 may include a client device 202 sending a UI request to the routing service 206, at 502. The UI request may be an HTTP request sent by a browser executing on the client device 202. If the UI request does not have a UI session token, at 504, then the routing service 206 may redirect the UI request to the login service 220, at 506.

If the UI request has a UI session token, at 504, then the routing service 206 may perform a cache lookup in the UI session cache 212, at 508. If the cache lookup fails, at 510, then the routing service 206 may redirect the UI request to the login service 220, at 512. If the cache lookup results in a hit, 510, the routing service 206 may determine whether the cache entry is valid, at 514. For example, referring to FIG. 3, the routing service 206 may check the validity flag 308 for the cache entry. If the cache entry is not valid, at 514, then the routing service 206 may redirect the UI request to the login service 220, at 516.

If the cache entry is valid, at 514, the routing service 206 may obtain information from the cache entry, which may include a tenant ID (TI) 310, one or more session identifiers (SI) 304, and authentication credentials (AC) 306, at 518. The routing service 206 may send the UI request, along with the tenant ID 310, session identifiers 304, and authentication credentials 306, to one or more of the UI applications 214, at 520. In some embodiments, the routing service 206 may send the UI session token 302 to the UI applications 214, which may use the UI session token 302 for additional authentication.

The UI applications 214 may maintain user sessions with these services 218. The UI applications 214 may use the session identifier 304 to select the user's sessions 532 with services 218, at 522. The UI applications 214 may call the services 218 over the user's sessions 532 with the authentication credentials 306. For example, the UI applications 214 may send the UI request, the tenant ID 310, and the authentication credentials 306 over the sessions 532 to the API gateway 216, at 524.

In some embodiments, the API gateway 216 may authenticate the user using the authentication credentials 306. The API gateway 216 may map the request to one or more services 218 using the map 222, at 526. The API gateway 216 may forward the UI request and tenant ID 310 to the services 218 according to the mapping, at 530. In some embodiments, the user may be authenticated by the services 218 instead of, or in addition to, the authentication by API gateway 216. In such embodiments, the API gateway 216 may forward the authentication credentials 306 to the services 218. In some embodiments, separate authentication credentials 306 are used by the API gateway 216 and the services 218. In some embodiments, each service 218 requires a different authentication credential 306 for a user.

In some embodiments, the API gateway 216 may use the tenant ID 310 to select particular services for a tenant. For example, the system 200 may provide a number of service levels at different price points, and may use the tenant ID 310 to select services for the tenant that are associated with the tenant's service level. As another example, the system 200 may provide one or more tenant-specific services 218, and may select those tenant-specific services 218 according to the tenant ID 310.

Each request may be served by multiple services. To keep track of these services for each request, some embodiments employ request tracing. For example, both the routing service 206 and the API gateway 216 may add unique identifiers to the UI requests, and the services may add these identifiers to the responses the services generate.

Each service 218 may authenticate the user using the authentication credentials 306, and may process the UI request. Each service 218 may use the tenant ID 310 to select tenant-specific data to process a request. Each service 218 may formulate a UI response, and may send the UI response to the API gateway 216, at 534. The APIs in the API gateway 216 may forward the UI response to the proper UI applications 214, at 536. The UI applications 214 may forward the UI responses to the routing service 206, at 538. The routing service 206 may forward the UI response to the client device 202 that originated the UI request, at 540.

In some embodiments, the routing service 206 may include a layout service to combine multiple Reponses into a web page to serve the user. For example, the responses received by the layout service may represent components of a web page, such as header, navigation, and footer. In some embodiments, the layout service may be implemented using Mosaic Tailor, which is an open-source layout service written in NodeJS.

Various embodiments provide several advantages over conventional systems. By using the disclosed UI session token, no user information is exposed outside the system. Following logon, all user authentications are handled completely within the system.

The routing service 206 dispatches requests to UI applications according to the routing rules in the routing rules database 210, which makes it possible to replace old UI applications page by page with new UI applications, but without customer-noticeable changes. The login service 220 may be used to implement a single sign-on service (SSO), two-factor authentication, and the like.

User access to the system is controlled using the UI session key. Therefore a system admin can easily and quickly restrict system access for a user by simply deleting or invalidating that user's cache entry in the UI session cache 212.

Figure 6:
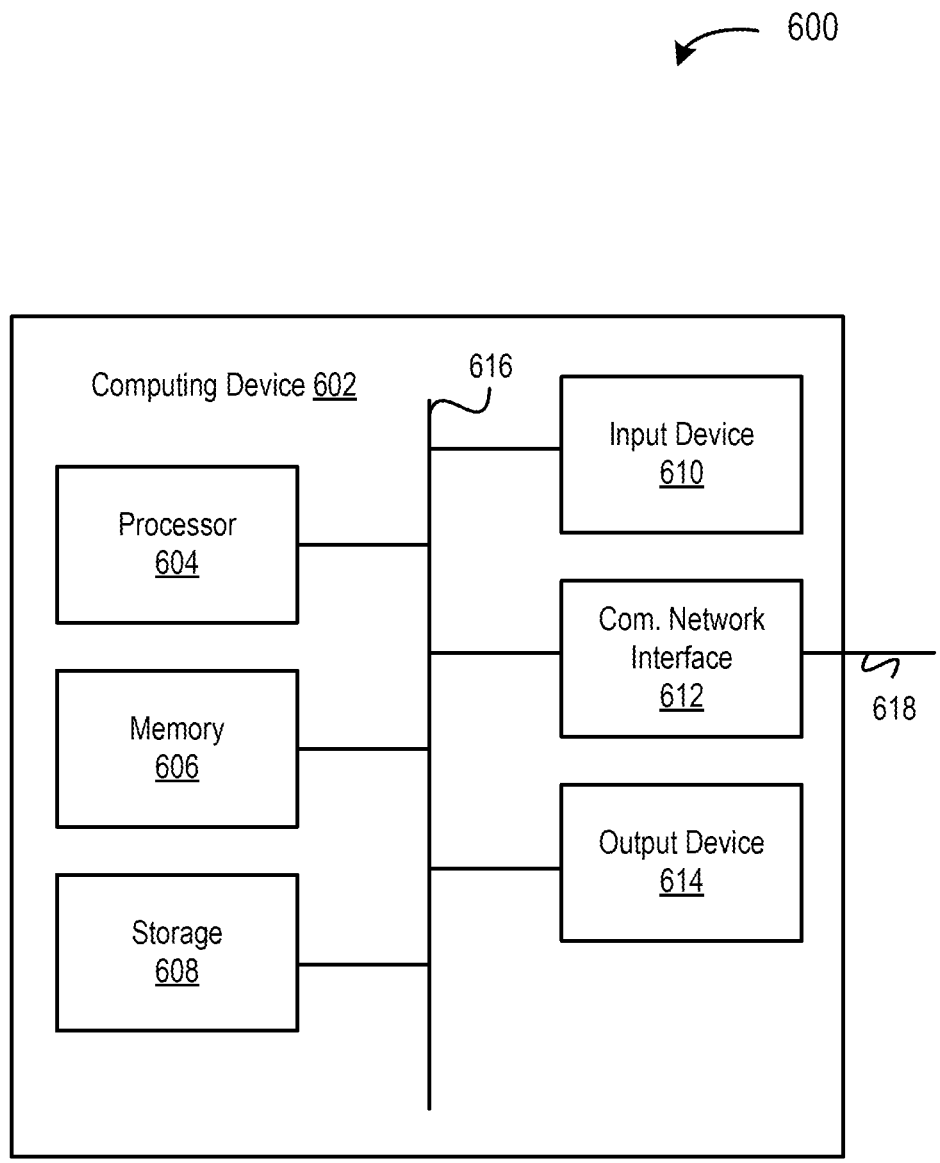
FIG. 6 is a block diagram illustrating an example computer system for implementing the features disclosed herein according to some embodiments.

FIG. 6 is a block diagram illustrating an example 600 of a computing device 602. Any of the systems, engines, datastores, and/or networks described herein may comprise an instance of one or more computing devices 602. In some embodiments, functionality of the computing device 602 is improved to the perform some or all of the functionality described herein. The computing device 602 comprises a processor 604, memory 606, storage 608, an input device 610, a communication network interface 612, and an output device 614 communicatively coupled to a communication channel 616. The processor 604 is configured to execute executable instructions (e.g., programs). In some embodiments, the processor 604 comprises circuitry or any processor capable of processing the executable instructions.

The memory 606 stores data. Some examples of memory 606 include storage devices, such as RAM, ROM, RAM cache, virtual memory, etc. In various embodiments, working data is stored within the memory 606. The data within the memory 606 may be cleared or ultimately transferred to the storage 608.

The storage 608 includes any storage configured to retrieve and store data. Some examples of the storage 608 include flash drives, hard drives, optical drives, cloud storage, and/or magnetic tape. Each of the memory system 606 and the storage system 608 comprises a computer-readable medium, which stores instructions or programs executable by processor 604.

The input device 610 is any device that inputs data (e.g., mouse and keyboard). The output device 614 outputs data (e.g., a speaker or display). It will be appreciated that the storage 608, input device 610, and output device 614 may be optional. For example, the routers/switchers may comprise the processor 604 and memory 606 as well as a device to receive and output data (e.g., the communication network interface 612 and/or the output device 614).

The communication network interface 612 may be coupled to a network (e.g., network 108) via the link 618. The communication network interface 612 may support communication over an Ethernet connection, a serial connection, a parallel connection, and/or an ATA connection. The communication network interface 612 may also support wireless communication (e.g., 602.11 a/b/g/n, WiMax, LTE, WiFi). It will be apparent that the communication network interface 612 may support many wired and wireless standards.

It will be appreciated that the hardware elements of the computing device 602 are not limited to those depicted in FIG. 6. A computing device 602 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 604 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A multi-tenant computing system, comprising:
one or more hardware processors; and
memory storing instructions that, when executed by the one or more hardware processors, cause the multi-tenant computing system to perform:
receiving, from a client computer, a request and a particular user interface session token;
determining whether a particular cache entry corresponding to the particular user interface session token is present in a user interface session cache, the user interface cache comprising a plurality of cache entries, each of the plurality of cache entries comprising at least one respective session identifier, a respective tenant identifier, and a respective authentication credential, the respective tenant identifier identifying a respective one of a plurality of tenants of the multi-tenant computing system; and
when the particular cache entry corresponding to the particular user interface session token is present in the user interface session cache:
retrieving, from the user interface session cache, the particular cache entry corresponding to the particular user interface session token, the particular cache entry including a plurality of particular session identifiers, a particular tenant identifier, and a particular authentication credential, and
providing the plurality of particular session identifiers, the particular tenant identifier, and the particular authentication credential to one or more user interface applications, the one or more user interface applications configured to generate a respective session to a respective service based on each of the plurality of particular session identifiers, the one or more user interface applications further configured to transmit the particular tenant identifier and the particular authentication credential over each respective session to the respective service, each respective service configured to perform authentication using the particular authentication credential, retrieve tenant-specific data using the particular tenant identifier, and perform a service process using the retrieved tenant-specific data.

2. The multi-tenant computing system of claim 1, wherein the instructions further cause the one or more processors to perform:
receiving, from each of the one or more user interface applications, a user interface response; and
sending results based on the one or more user interface responses to the client computer.

3. The multi-tenant computing system of claim 1, wherein the instructions further cause the one or more processors to perform:
when the particular cache entry corresponding to the user interface session token is not present in the user interface session cache, directing the request to a login service.

4. The multi-tenant computing system of claim 3, wherein the instructions further cause the one or more processors to perform:
when the login service receives valid login credentials from the client computer, sending a new user interface session token to the client computer.

5. The multi-tenant computing system of claim 1, wherein the instructions further cause the one or more processors to perform:
invalidating one or more of the cache entries in the user interface session cache according to a cache expiry policy; and
determining whether the particular cache entry corresponding to the particular user interface session token is valid.

6. The multi-tenant computing system of claim 1, wherein the authentication credential is an Open Authorization (OAuth) bearer token.

7. A method being implemented by a multi-tenant computing system including one or more physical processors and storage media storing machine-readable instructions, the method comprising:
receiving, from a client computer, a request and a particular user interface session token;
determining whether a particular cache entry corresponding to the particular user interface session token is present in a user interface session cache, the user interface cache comprising a plurality of cache entries, each of the plurality of cache entries comprising at least one respective session identifier, a respective tenant identifier, and a respective authentication credential, the respective tenant identifier identifying a respective one of a plurality of tenants of the multi-tenant computing system; and when the particular cache entry corresponding to the particular user interface session token is present in the user interface session cache:
retrieving, from the user interface session cache, the particular cache entry corresponding to the particular user interface session token, the particular cache entry including a plurality of particular session identifiers, a particular tenant identifier, and a particular authentication credential, and providing the plurality of particular session identifiers, the particular tenant identifier, and the particular authentication credential to one or more user interface applications, the one or more user interface applications configured to generate a respective session to a respective service based on each of the plurality of particular session identifiers, the one or more user interface applications further configured to transmit the particular tenant identifier and the particular authentication credential over each respective session to the respective service, each respective service configured to perform authentication using the particular authentication credential, retrieve tenant-specific data using the particular tenant identifier, and perform a service process using the retrieved tenant-specific data.

8. The method of claim 7, further comprising:
receiving, from each of the one or more user interface applications, a user interface response; and
sending results based on the one or more user interface responses to the client computer.

9. The method of claim 7, further comprising:
when the particular cache entry corresponding to the user interface session token is not present in the user interface session cache, directing the request to a login service.

10. The method of claim 9, further comprising:
when the login service receives valid login credentials from the client computer, sending a new user interface session token to the client computer.

11. The method of claim 7, further comprising:
invalidating one or more of the cache entries in the user interface session cache according to a cache expiry policy; and
determining whether the particular cache entry corresponding to the particular user interface session token is valid.

12. The method of claim 7, wherein the authentication credential is an Open Authorization (OAuth) bearer token.

13. A non-transitory computer readable medium comprising instructions that, when executed, cause one or more processors in a multi-tenant computing system to perform:
receiving, from a client computer, a request and a particular user interface session token;
determining whether a particular cache entry corresponding to the particular user interface session token is present in a user interface session cache, the user interface cache comprising a plurality of cache entries, each of the plurality of cache entries comprising at least one respective session identifier, a respective tenant identifier, and a respective authentication credential, the respective tenant identifier identifying a respective one of a plurality of tenants of the multi-tenant computing system; and
when the particular cache entry corresponding to the particular user interface session token is present in the user interface session cache:
retrieving, from the user interface session cache, the particular cache entry corresponding to the particular user interface session token, the particular cache entry including a plurality of particular session identifiers, a particular tenant identifier, and a particular authentication credential, and providing the plurality of particular session identifiers, the particular tenant identifier, and the particular authentication credential to one or more user interface applications, the one or more user interface applications configured to generate a respective session to a respective service based on each of the plurality of particular session identifiers, the one or more user interface applications further configured to transmit the particular tenant identifier and the particular authentication credential over each respective session to the respective service, each respective service configured to perform authentication using the particular authentication credential, retrieve tenant-specific data using the particular tenant identifier, and perform a service process using the retrieved tenant-specific data.

14. The non-transitory computer readable medium of claim 13, wherein the instructions further cause the one or more processors to perform:
receiving, from each of the one or more user interface applications, a user interface response; and
sending results based on the one or more user interface responses to the client computer.

15. The non-transitory computer readable medium of claim 13, wherein the instructions further cause the one or more processors to perform:
when the particular cache entry corresponding to the user interface session token is not present in the user interface session cache, directing the request to a login service.

16. The non-transitory computer readable medium of claim 15, wherein the instructions further cause the one or more processors to perform:
when the login service receives valid login credentials from the client computer, sending a new user interface session token to the client computer.

17. The non-transitory computer readable medium of claim 13, wherein the instructions further cause the one or more processors to perform:
invalidating one or more of the cache entries in the user interface session cache according to a cache expiry policy; and
determining whether the particular cache entry corresponding to the particular user interface session token is valid.

18. The non-transitory computer readable medium of claim 13, wherein the authentication credential is an Open Authorization (OAuth) bearer token.

* * * * *